2,982,698

PREPARATION OF THIOSTREPTON

Thomas B. Platt, Neshanic Station, N.J., assignor to Olin Mathieson Chemical Corporation, New York, N.Y., a corporation of Virginia No Drawing. Filed Mar. 31, 1958, Ser. No. 725,776

7 Claims. (Cl. 195—80)

This invention relates to a process for preparing antibiotics, and more particularly to an improved process for preparing thiostrepton by incorporating a heavy metal cation in the fermentation medium in which it is formed.

In the U.S. application of Donovick et al., Serial No. 491,392, filed March 1, 1955, the production of a new antibiotic, thiostrepton, is disclosed. It has now been found that the titer of recoverable thiostrepton can be increased beyond that obtainable in the processes disclosed in said application, by incorporating into the medium the cation of a heavy metal of groups IV through VIII of the periodic table in such amount that the concentration of heavy metal cation in the medium is in the range of about 0.25 to about 12 millimoles per liter of medium.

It has further been found that the yield of thiostrepton can be further increased beyond that obtainable by simply adding such a cation if a mixture of heavy metal cations is present. When such a mixture is added to the medium, the total concentration of cations should be in the concentration range mentioned hereinbefore.

Further increases in thiostrepton yields are obtainable when phosphate anion is present in the medium in a concentration range of about 0.5 to about 3 millimoles per liter in addition to the heavy metal cations.

The process of this invention, therefore, essentially comprises incorporating into a fermentation medium containing a thiostrepton-producing strain of Streptomyces, the cation of a heavy metal of groups IV through VIII of the periodic table in such amount that the concentration of heavy cation in the medium is in the range of about 0.25 to about 12 millimoles per liter of medium. To be effective, this addition must be made within the first forty-eight hours of the fermentation and may be achieved by adding the heavy metal cation directly to the nutrient medium, either before sterilization and inoculation, or after inoculation, as long as 48 hours has not elapsed.

Any heavy metal cation of groups IV through VIII of the periodic table may be used. Such cations include those of iron, manganese, tin, cobalt, nickel and vanadium. These cations may be added to the medium in any soluble form, such as salts. The preferred salts are those with inorganic anions, such as a sulfate or halide (e.g. chloride). Representative of specifiic salts which may be employed are cobaltous chloride, manganous sulfate, ferrous sulfate, stannous chloride, nickelous chloride, and vanadyl sulfate. The cation is added in such amount that the concentration of cation in the medium is in the range of about 0.25 millimole to about 12 millimoles (preferably about 1 to about 2 millimoles) per liter of medium in the absence of added phosphate.

A preferred modification in the process of this invention entails the use of a mixture of heavy metal cations, such as a mixture of ferrous sulfate and cobaltous chloride or a mixture of ferrous sulfate, manganous sulfate and cobaltous chloride, instead of a single heavy metal cation. In this case, for optimal yield of thiostrepton, each heavy metal cation should be present in the preferred range of concentration given hereinbefore, so that the total concentration of free heavy metal cation can be about 3 to about 6 millimoles per liter if three heavy metal cations are used.

Another preferred modification involves the inclusion of a phosphate anion in the medium. This may be accomplished by adding to the medium an alkali metal salt of phosphate, such as dibasic sodium phosphate. To be effective the phosphate anion should be present in a concentration of at least about 0.5 millimole per liter of medium. As stated before, if a phosphate anion is used, the amount of heavy metal cation introduced must be increased so that there is present sufficient cation to fully satisfy the requirements of the phosphate anion and still leave a concentration of free heavy metal cation in the ranges set forth hereinbefore. The particularly preferred molar ratio of heavy metal cation to phosphate anion is about 1:1 to 3:1. Furthermore, it has been found that for optimal yield the phosphate and heavy metal cation should be added simultaneously.

In all other respects the nutrient media used in the process of this invention correspond to those commonly employed in the production of thiostrepton. Thus a thiostrepton-producing strain of Streptomyces is grown at a suitable temperature of from 20° C. to 35° C., preferably 25° C. to 27° C., under submerged aerobic conditions in an aqueous nutrient medium containing an assimilable, fermentable carbon and energy source and an assimilable nitrogen source. Suitable sources of carbon include carbohydrates such as: starch, dextrin, and sugars such as maltose, lactose, and glucose. Suitable sources of nitrogen include substances such as peptone and soybean meals. Since thiostrepton contains sulfur, a source of sulfur such as sodium sulfate also should be included. The medium, furthermore, is preferably buffered by the addition of calcium carbonate or other buffering agents. The fermentation is carried out for about 72 to 168 hours at a pH in the range of about 6 to 8.

After fermentation is completed, the thiostrepton is recovered by the methods disclosed in the aforementioned U.S. application. This recovery may be effected by filtering or centrifuging the whole broth and recovering the mycelium cake. The thiostrepton is then extracted from the mycelium cake by means of a suitable organic solvent, such as chloroform, dioxane, an N,N-di(lower alkyl)lower alkanoic acid amide (e.g. N,N-dimethylformamide or N,N-dimethylacetamide) or benzyl alcohol.

The following examples illustrate the process of this invention. In each instance the basal medium contained 3% Staley's Special Nutrient $4_S$ (a special soybean oil meal prepared by A. E. Staley Co., Decatur, Illinois); 5% glucose, 0.5% $CaCO_3$; and 0.2% $Na_2SO_4$. The microorganism used was Streptomyces sp. WC 3705 (Waksman Collection, Institute of Microbiology, Rutgers University, New Brunswick, New Jersey). Except for the addition of the heavy metal salt or phosphate as indicated, the procedure employed was as follows:

*Germination stage.*—A loopful of a culture of Streptomyces sp. WC 3705 is transferred to a 500 ml. flask containing the following medium:

| | |
|---|---|
| Staley's Special Nutrient $4_S$ | g 30 |
| Dextrose | g 30 |
| $CaCO_3$ | g 5.0 |
| NaCl | g 1.0 |
| Tap water | ml 1000 |

The flask is incubated for three days at 25° C. on a rotary shaker (280 r.p.m. per minute, 2 inch throw).

*Fermentation stage.*—A 4 ml. inoculum prepared in the germination stage is transferred to a 250 ml. Erlenmeyer flask containing 50 ml. of the basal medium. The flask is incubated for five days at 25° C. on a rotary shaker. At the end of 5 days, a dimethyl sulfoxide extract of the broth is tested for activity against *Staphylococcus aureus*.

The following experiments show the effect of various heavy metal salts (added to medium before inoculation) on thiostrepton production:

| Example | Salt | Cation concentration (millimoles per liter of medium) | Thiostrepton production (u./ml.) |
|---|---|---|---|
| 1 | None | | 140 |
| 2 | $CoCl_2 \cdot 6H_2O$ | 1 | 200 |
| 3 | $CoCl_2 \cdot 6H_2O$ | 2 | 220 |
| 4 | $MnSO_4 \cdot 4H_2O$ | 1.4 | 190 |
| 5 | $MnSO_4 \cdot 4H_2O$ | 2.8 | 180 |
| 6 | $FeSO_4 \cdot 7H_2O$ | 1 | 210 |
| 7 | $FeSO_4 \cdot 7H_2O$ | 2 | 160 |
| 8 | $NiCl_2 \cdot 6H_2O$ | 0.42 | 230 |
| 9 | $SnCl_2 \cdot 2H_2O$ | 1.7 | 330 |
| 10 | $VOSO_4 \cdot 2H_2O$ | 0.50 | 360 |

By way of contrast the following salts proved to be without effect or inhibitory to thiostrepton production: $BaCl_2 \cdot 2H_2O$, $CdSO_4 \cdot 8H_2O$, $MgSO_4 \cdot 7H_2O$, $AgNO_3$, $KMnO_4$, $KIO_3$, $Na_2MoO_4 \cdot 2H_2O$, $NaBr$, $NaF$, $$NaHAsO_4 \cdot 7H_2O$$

$NaAsO_2$, $ZnSO_4 \cdot 7H_2O$, $Al_2(SO_4)_3 \cdot 18H_2O$, $HgCl_2$, $K_2Cr_2O_7$, $KI$, $NaNO_3$, $KCN$, $K_3Fe(CN)_6$, $K_4Fe(CN)_6$, $H_3BO_3$, $KCNS$, and $Na_2S$.

The following examples show the added advantage of using a mixture of heavy metal salts (added to medium before inoculation) rather than a single salt alone:

| Example | Salt | Cation concentration (millimoles per liter of medium) | Thiostrepton production (u./ml.) |
|---|---|---|---|
| 11 | None | | 260 |
| 12 | $CoCl_2 \cdot 6H_2O$ | 1 | 340 |
| 13 | $CoCl_2 \cdot 6H_2O$ | 2 | 370 |
| 14 | $CoCl_2 \cdot 6H_2O$ | 4 | 320 |
| 15 | $MnSO_4 \cdot 4H_2O$ | 1.0 | 290 |
| 16 | $FeSO_4 \cdot 7H_2O$ | 0.5 | 330 |
| 17 | $FeSO_4 \cdot 7H_2O$ | 1.0 | 360 |
| 18 | $FeSO_4 \cdot 7H_2O$ | 1.5 | 360 |
| 19 | $FeSO_4 \cdot 7H_2O$ | 3.0 | 240 |
| 20 | $CoCl_2 \cdot 6H_2O + FeSO_4 \cdot 7H_2O$ | Co 1.0 + Fe 1.0 | 490 |
| 21 | $CoCl_2 \cdot 6H_2O + MnSO_4 \cdot 4H_2O$ | Co 1.0 + Mn 1.0 | 420 |
| 22 | $FeSO_4 \cdot 7H_2O + MnSO_4 \cdot 4H_2O + CoCl_2 \cdot 6H_2O$ | Fe 1.0 + Mn 1.0 + Co 1.0 | 590 |

The following examples show the effect of the addition of $Na_2HPO_4$ at the same time as the addition of a mixture of $FeSO_4 \cdot 7H_2O + MnSO_4 \cdot 4H_2O + CoCl_2 \cdot 6H_2O$, before inoculation:

| Example | Phosphate Concentration, millimoles/l | Salt Concentration [1] | Thiostrepton production (u./ml.) |
|---|---|---|---|
| 23 | 0 | 1 | 440 |
| 24 | 1 | 1 | 530 |
| 25 | 2 | 1 | 510 |
| 26 | 4 | 1 | 350 |
| 27 | 8 | 1 | 230 |
| 28 | 1 | 2 | 630 |
| 29 | 2 | 2 | 680 |

[1] 1 = 1.26 mM Co + 1.08 mM Fe + 2.24 mM Mn per liter. 2 = 2.52 mM Co + 2.16 mM Fe + 4.48 mM Mn per liter.

Examples 23 through 29 further show that if insufficient free heavy metal cation is present the production of thiostrepton is inhibited.

The following examples show the need to add the heavy metal salts before the fermentation has progressed for 48 hours. In each example, 1.26 mM Co (as $$CoCl_2 \cdot 7H_2O) + 2.24$$

mM Mn (as $MnSO_4 \cdot 4H_2O) + 1.08$ mM Fe (as $$FeSO_4 \cdot 7H_2O)$$

per liter is added to the medium at the indicated time:

| Example | Time of Addition (hours) | Thiostrepton production (u./ml.) |
|---|---|---|
| 30 | Before sterilization | 720 |
| 31 | 48 | 900 |
| 32 | 48 | 340 |
| 33 | 72 | 190 |
| 34 | 96 | 180 |

The invention may be otherwise variously embodied within the scope of the appended claims.

What is claimed is:

1. In the preparation of thiostrepton by fermentation with Streptomyces sp. WC 3705, the improvement which comprises adding to the fermentation medium a cation of a heavy metal of groups IV through VIII of the periodic table in such amount that the concentration of heavy metal cation in the medium is in the range of about 0.25 to about 12 millimoles per liter of medium.

2. The process of claim 1 wherein the heavy metal cation is added during the first 48 hours of fermentation.

3. The process of claim 2 wherein a mixture of heavy metal cations are added.

4. The process of claim 2 wherein a source of phosphate anion is also added to the medium.

5. The process of claim 2 wherein the heavy metal is cobalt.

6. The process of claim 2 wherein the heavy metal is iron.

7. The process of claim 2 wherein the heavy metal is manganese.

References Cited in the file of this patent
UNITED STATES PATENTS

| | | |
|---|---|---|
| 2,709,672 | Petty | May 31, 1955 |
| 2,734,018 | Minieri et al. | Feb. 7, 1956 |
| 2,797,183 | Hazen et al. | June 25, 1957 |
| 2,797,187 | Szumski et al. | June 25, 1957 |
| 2,844,515 | Sobotka et al. | July 22, 1958 |

OTHER REFERENCES

Porter: Bacterial Chemistry and Physiology, 1946, Wiley, New York, page 629.

Waksman: The Actinomycetes, 1950, Chronica Botanica Co., Waltham, Mass., pp. 83–84.

Antibiotics Annual, 1955–1956, Medical Encyclopedia, Inc., New York, 1956, pp. 554–559.